United States Patent Office 3,470,118
Patented Sept. 30, 1969

3,470,118
FLAME-RESISTANT POLYOL URETHANE FOAM COMPOSITION AND PROCESS OF PRODUCING THE SAME
Wolfgang C. Forster, Middletown, N.Y., assignor to Reichhold Chemicals, Inc., White Plains, N.Y.
No Drawing. Filed May 20, 1966, Ser. No. 551,561
Int. Cl. C08j 1/18; C08g 22/44
U.S. Cl. 260—2.5                                8 Claims

ABSTRACT OF THE DISCLOSURE

This application discloses a blend of (a) an oxyalkylated phenol-formaldehyde condensation product and (b) an oxyalkylated mono and/or polyamine, consisting of about 10% to about 70% of compound (a) and about 90% to about 30% of compound (b). These blends react readily with polyisocyanates, forming polyurethanes with greatly improved flame resistance.

---

This invention relates to novel polyurethane compositions, to rigid foams prepared therefrom and to the process of producing such compositions and such rigid foams. More particularly this invention relates to the production of an improved flame resistant rigid polyurethane foam, wherein a novel blend of (a) an oxyalkylated novolac and (b) an oxyalkylated amine is used as the polyfunctional polyol.

Rigid foams are conventionally prepared by processes employing mixtures comprising a polyisocyanate and a hydroxyl terminated polyester or polyoxyalkylene ether having a hydroxyl number within the range of 350–900. Rigid foams derived from polyurethane resins have become important commercial articles in recent years. In particular it has become necessary for many polyurethane foam applications to have a foam which is either self-extinguishing or substantially non-combustible. Prior art has taught that those properties have generally been achieved by the addition of extraneous fire retardants such as antimony trioxide, halogen-containing compounds, organo-phosphorous, organo-boron compounds and the like. However, those compounds are normally required in an amount such that other qualities of the rigid polyurethane foams are very severely affected. For example, the addition of boron compounds might well increase the flame resistance considerably, but at the same time they would increase also the moisture absorption and thus interfere with the aging properties. Similarly through incorporation of some of the above mentioned additives a product can be obtained which possesses a high degree of flame resistance, yet the use of those additives is deleterious to the physical properties of a foam and also can lead to poor cell structures and collapse.

Prior art has further taught the use of nitrogen containing polyols derived from Mannich type condensation products, by reacting them with an alkylene oxide. A typical product of this kind is a condensation product of phenol, formaldehyde and any primary or secondary alkanol amine, which is subsequently reacted with propylene oxide. While these types of products possess an acceptable fire resistance, they nevertheless appear to have a number of shortcomings. The tendency to gel during the preparation of the polyol is considerably increased if the above mentioned teachings are adhered to. High viscosities of these reaction products are also objectionable and compatibility with blowing agents is mediocre.

Prior art has still further taught the use of phosphorus and halogen bearing polyols, thus making the phosphorus and the halogens an integral part of the polyurethane molecule. The use of bis-dipropyleneglycolphosphite, tridipropyleneglycolphosphite, bis-polypropyleneglycolphosphite and the like as well as their corresponding phosphonates have been described and illustrated.

Halogenated derivatives such as bis-dipropyleneglycoltrichloro-methanephosphonates and the like were described and their application in the preparation of polyurethane foams therefrom illustrated. The fire retarding properties of foam derived from above mentioned phosphorus-halogen containing organic reactants were not satisfactory, especially when used in rigid preparation. Also the resistance to high temperature and high humidity left much to be desired and the general stability and resistance to shrinkage were mediocre.

I have now found that these disadvantages, which occur using the above mentioned extraneous fire retardants and phosphorus and halogen bearing polyols can be overcome by the use of a novel blend consisting of an oxyalkylated novolac (component (a)) and an oxyalkylated amine (component (b)). The ratio of components (a) and (b) may vary widely within the scope of my invention which in its broadest concept contemplates from about 10% to 70% of component (a) to from 90% to 30% of component (b). Where components (a) and (b) are propoxylated a range of from about 20% to 50% has been found preferable. Within this range about 40% of component (a) and about 60% of component (b) is found particularly satisfactory, as will appear hereinafter. It was entirely unexpected that the foam prepared from the blend as described in this invention shows greater fire resistance, good dimensional strength and excellent humid aging and still retains all other expected properties which are inherent to normal foams.

It is, therefore, an object of my invention to prepare novel blends of oxyalkylated novolacs and oxyalkylated amines.

It is another object of my invention to prepare novel polyurethane foam compositions.

It is also an object of my invention to prepare an improved rigid polyurethane foam.

It is a further object of my invention to provide an improved process for the preparation of polyurethane foams, having improved fire resistance.

Still further objects and the entire scope of the applicability of the present invention will become apparent from the detailed description given hereinafter; it should be understood, however, that the detailed description and specific examples, while indicating preferred embodiments of the invention are given by way of illustration only, since various changes and modifications within the spirit and scope of the invention will become apparent to those skilled in the art from the detailed description.

The term "flame resistant" as employed herein is used to characterize a material which does not burn readily. The terms "burning," "non-burning," and "self-extinguishing" are defined in accordance with the "Tentative Method of Test for Flammability of Plastics Foams and Sheeting" ASTM D–1692–59T.

The term "cream time" is defined as the time from the start of mixing the components to the point where the mixture begins to assume a cream colored appearance, shortly before the mass rises. The term "rise time" is defined as the time from the start of mixing the components to the point where the rise is complete. The phenols which can be employed to produce novolacs are monohydric phenols which have at least 2 hydrogen atoms which are reactive towards an aldehyde.

The phenols include among others, phenol, ortho cresol, para cresol, 3,5-dimethylphenol, 2,5-dimethylphenol, ortho ethylphenol, para ethylphenol, ortho isopropylphenol, para isopropylphenol, ortho propylphenol, para propylphenol, ortho butylphenol, para butylphenol, ortho tertiary butylphenol, para tertiary butylphenol, ortho phenylphenol, para phenylphenol, monohaloparaphenol, monohaloorthophenol and the like, but straight phenol is preferred because of the outstanding properties achieved therefrom.

Representative aldehydes which can be employed to produce novolacs include among others formaldehyde or paraformaldehyde, acetaldehyde, propionaldehyde, butyraldehyde, valeraldehyde, hexaldehyde, heptaldehyde or the like, but the preferred aldehyde is the formaldehyde because of the outstanding properties achieved therefrom. The aldehydes are represented by the following formula:

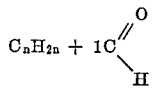

wherein $n$ is an integer of 0–10.

Nitrogen bearing reactants which serve to produce the polyols by alkoxylation are represented by the following general formula:

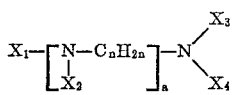

wherein $X_1$, $X_2$, $X_3$, $X_4$ are selected from the group of

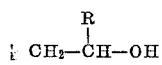

and hydrogen and wherein R is hydrogen, alkyl, aryl, halogenalkyl and halogenaryl, and wherein $a$ is 0, 1, 2, 3, 4, 5 and $n$ is an integer equal to or greater than 2.

Nitrogen bearing reactants comprise among others ammonia, monoethanolamine, diethanolamine, triethanolamine, monoisopropanolamine, dipropanolamine, tripropanolamine, mono-butanolamine, dibutanolamine, tributanolamine, alkylenediamines like ethylenediamine, dialkylenetriamines like diethylenetriamine and the like, but the preferred amines are alkanol amines because outstanding properties are achieved therefrom.

Representative 1,2-epoxides are ethylene oxide, propylene oxide, butylene oxide and styrene oxide, but propylene oxide is the preferred alkylene oxide because of the outstanding properties achieved therefrom.

The proportion of the reactants employed to prepare the novolac and the conditions under which they are reacted can be varied over a wide range. A desirable molar ratio of phenol-formaldehyde is from 10:5 to 10:8. As a rule, the reactants are heated in the presence of oxalic acid and the temperature is kept at approximately 80° C. until the exothermic reaction has subsided whereupon the condensation is brought to completion by additional heating.

After removal of the water the volatiles are stripped off and the novolac is ready for propoxylation. The preferred method to carry out this propoxylation is to react 1 mol of phenolic hydroxyl with at least 1 mol of propylene oxide by adding the latter ingredient slowly in the presence of a catalyst, such as benzyltrimethylammoniummethoxide, reacting the same at about 135–140° C. and stripping off the volatiles. The proportion of the reactants employed to prepare the propoxylated amine and the conditions under which they were reacted can be varied over a wide range.

A desirable molar ratio of alkanol amine to propylene oxide is 14:45.5. The condensation is accomplished under pressure in an autoclave and the exothermic reaction is controlled by cooling. The preferred reaction temperature is 120–160° C. The propoxylation can be considered complete when the calculated amount of propylene oxide is consumed. After this the volatiles can be stripped off. The condensation products as described herein are used to prepare flame retardant polyol blends, preferentially consisting of about 40% of the above described propoxylated novolac, component (a), and about 60% of the described propoxylated amine, component (b). The blending operation is conveniently conducted at elevated temperatures. The components of the blends are described in Table No. 1, below.

Conventional equipment can be employed for above portrayed condensation reactions, for example, a reaction vessel suitable for pressure and vacuum, equipped with an agitator and a condenser for reflux and distillation, also a gas inlet and heat transfer means. Material of construction can be stainless steel, glass, Monel or the like.

The preparation of the foams was carried out by well known techniques and the formulations are illustrated in Table No. 2, below.

The invention will be more readily understood by reference to the accompanying specific examples which are intended as illustrative only rather than as limiting the invention to the specific details set forth therein, except as defined in the accompanying claims.

PREPARATION OF OXYALKYLATED NOVOLACS

Resin A

To a 3,000 ml. three-necked flask equipped with thermometer, stirrer and reflux condenser, the following ingredients were charged:

|   | Grams |
|---|---|
| Phenol (10.0 mols) | 941 |
| Aqueous formaldehyde (37%) solution (7.8 mols) | 630 |
| Oxalic acid | 9.4 |

The mixture was heated to about 70–77° C., at which point an exothermic reaction sets in. By external cooling, the temperature was held at 80–85° C., and when the exotherm abated, reaction was completed by heating the charge under reflux (97–100° C.) for an additional two hours. The reaction product was then allowed to separate for ½-hour, and the sepernatant aqueous phase was removed and discarded. The crude phenolic novolac remaining in the flask was stripped of water and unreacted phenol by raising the temperature up to 180° C. while a reduced pressure of 12 mm. Hg was applied. There remained in the flask 927 grams of purified novolac, containing 8.86 mols of phenolic hydroxyl groups. To this novolac, 9 grams of a solution of benzyltrimethylammoniummethoxide (40% in methanol) was added, the temperature raised to 135–145° C., and 660 g. of propylene oxide were slowly added at such a rate as to maintain a gentle reflux. After the addition was finished, the product was stripped at 150° C. and 25 mm. Hg reduced pressure in order to remove unreacted volatiles. A weight check showed that the novolac had reacted with 598 g. of propylene oxide (10.3 mols). The resin had an OH number of 327.

Resin B

To a 3000 ml. three-necked flask equipped with thermometer, stirrer and reflux condenser, the following ingredients were charged:

|   | Grams |
|---|---|
| Phenol (10.0 mols) | 941 |
| 37% aqueous formaldehyde solution (5.0 mols) | 405 |
| Oxalic acid | 9 |

The mixture was heated to 75–80° C., at which point an exothermic reaction ensued. By external cooling, the temperature was held at 80–85° C. until the exotherm abated. The product was subsequently refluxed at 97–100° C. for an additional three hours. Then the aqueous supernatant phase was withdrawn and discarded. The crude novolac was heated at 160° C. at 24 mm. Hg until no more volatiles distilled off. The yield of the novolac after stripping was 721 grams, containing 7.08 mols of phenolic hydroxyl groups. To the novolac 15 g. of a solution of benzyl-trimethyl-ammoniummethoxide (40% in methanol) was 50 g. of methyl isobutyl ketone were added, a reflux condenser was attached, the temperature raised to 135–145° C., and 410 grams of propylene oxide slowly added. After the addition was finished, the product was stripped at 150° C. and 30 mm. Hg reduced pressure in order to remove unreacted volatiles. By weight check it was determined that 386 g. of propylene oxide (6.65 mols) had reacted with the novolac. The resulting resin was a semi-solid, and the hydroxyl number was 360.

Resin C

To a 5,000 ml. three necked flask equipped with thermometer, stirrer and reflux condenser, the following ingredients were charged:

| | Grams |
|---|---|
| Phenol (30 mols) | 2820 |
| 37% aqueous formaldehyde solution (23.4 mols) | 1896 |
| Oxalic acid | 26 |

The mixture was slowly heated to about 70° C., at which point an exothermic reaction ensued. By external cooling, the temperature was held at 80–85° C. When the exotherm abated, the batch was heated under reflux (97–100° C.) for an additional four hours. The supernatant aqueous phase was withdrawn and discarded. The batch was heated slowly at atmospheric pressure in order to distill off residual water until the temperature reached 150° C. Under these conditions, most of the unreacted phenol remained in the resin. The yield of the dehydrated resin was 3075 grams containing 29.7 mols phenolic hydroxyl groups.

There were charged 2200 grams of said dehydrated novolac corresponding to 21.2 mols phenolic hydroxyl groups and 42 grams of trimethyl amine to a 1 gallon autoclave, equipped with heating mantle, cooling coils, stirrer and a feed line entering at the bottom. The temperature was raised to 135° C. and 1320 grams of propylene oxide (22.8 mols) were slowly pumped in, keeping the maximum internal pressure at about 125 p.s.i. By applying some cooling, the exothermic reaction was kept in the range of 135–145° C. After all propylene oxide had been added, reduced pressure of 80 mm. Hg was applied at 150° C. in order to remove volatiles. A semi-solid resin was obtained in a yield of 3438 grams. The hydroxyl number was 340.

PREPARATION OF OXYALKYLATED AMINES

Resin U

To a 5,000 ml. three-necked flask equipped with thermometer, dropping funnel, stirrer and reflux condenser, the following ingredients were charged:

| | Grams |
|---|---|
| Triethanol amine (8.0 mols) | 1192 |
| Benzyl-trimethyl-ammonium-methoxide solution (40% in methanol) | 24 |

The temperature was raised to 135° C. and 1420 g. (24.4 mols) of propylene oxide were slowly added. When the addition was completed, the reaction product was stripped at 150° C. and 25 mm. Hg reduced pressure in order to remove unreacted volatiles. A viscous liquid was obtained in a yield of 2618 grams. Nitrogen content 4.33%; hydroxyl number 519; viscosity at 25° C., 250 cp.

Resin V

To a 3,000 ml. three-necked flask equipped with thermometer, dropping funnel, stirrer and reflux condenser, the following ingredients were charged:

| | Grams |
|---|---|
| Triethanol amine (9.0 mols) | 1341 |
| Benzyl-trimethyl-ammonium-methoxide solution (40% in methanol) | 26 |

The temperature was raised to 135–145° C., and 1086 grams (18.7 mols) of propylene oxide were slowly added. When the addition was completed, the reaction product was stripped at 150° C. and 25 mm. Hg reduced pressure in order to remove unreacted volatiles. By checking the weight difference before and after propoxylation, it was determined that 1045 propylene oxide (18.0 mols) were chemically combined with the triethanol amine.

The reaction product was obtained in a yield of 2396 grams. Nitrogen content, 5.33%; hydroxyl number 648; viscosity at 25° C., 225 cp.

Resin W

To a 1-gallon autoclave, equipped with heating mantle, cooling coils, stirrer and feed line entering at the bottom, there was charged 870 g. (17.65 mols) of aqueous ammonia (28–30% $NH_3$). It was heated at 60–70° C., and 2266 g. (38.9 mols) of propylene oxide were slowly pumped in at pressures not exceeding 100 p.s.i. After the addition was completed, the batch was held at 70° C. for another hour, then cooled to 25° C. and transferred to a 5,000 ml. three-necked flask equipped with stirrer, thermometer, condenser and distilling receiver. The reaction product was heated at atmospheric pressure until the batch temperature had reached 178° C. Water and excess ammonia were stripped off. The product remaining in the flask weighed 1997 g. and contained 7.64% of nitrogen.

Of said product 1739 grams were transferred back into the autoclave and 36 grams of benzyl-trimethyl-ammonium-methoxide solution (40% in methanol) were added. The temperature was raised to 130° C., and 465 g. of propylene oxide (8.0 mols) were slowly pumped in, keeping the pressure below 30 p.s.i. After the propylene oxide addition was completed, the reaction product was stripped at 150° C. and 50 mm. Hg. The yield was 2157 grams of a straw-colored liquid, nitrogen content, 6.15%; hydroxyl number, 739; viscosity at 25° C., 865 cp.

Resin X

To a 1-gallon autoclave, equipped with heating mantle, cooling coils, stirrer and feed line entering at the bottom, there was charged:

| | Grams |
|---|---|
| Monoethanol amine (14.0 mols) | 855 |
| Benzyl-trimethyl-ammonium-methoxide solution (40% in methanol) | 28 |

The temperature was raised to 130° C. and 2645 grams (45.5 mols) of propylene oxide were slowly pumped in, while controlling the exothermic reaction through cooling. After the addition was completed, the product was stripped at 50 mm. Hg reduced pressure and at a temperature of 150° C. The yield was 3390 grams of a light-yellow liquid, nitrogen content, 5.69%; hydroxyl number, 685; viscosity, 590 cp. at 25° C.

Resin Y

To a 1-gallon autoclave, equipped with heating mantle, cooling coils, stirrer and feed line entering at the bottom, the following ingredients were charged:

| | Grams |
|---|---|
| Diethanol amine (12.5 mols) | 1320 |
| Aqueous potassium hydroxide (45%) solution | 10 |

The temperature was raised to 130° C., and 2100 grams (36.2 mols) of propylene oxide were slowly pumped in under conditions as set forth in the preceding example. After the addition was completed, 21.5 grams of a 50% aqueous tartaric acid solution was added and the product subsequently stripped at 150° C. and 50 mm. Hg and filtered. Yield: 3400 grams of a straw-colored liquid, hydroxyl number, 619; nitrogen content, 5.00%; viscosity at 25° C., 338 cp.

Resin Z

To a 1-gallon autoclave, equipped with heating mantle, cooling coils, stirrer and feed line entering at the bottom, the following ingredients were charged:

| | Grams |
|---|---|
| Ethylene diamine (98–100%) (6.5 mols) | 397 |
| Benzyltrimethyl-ammonium-methoxide solution (40% in methanol) | 24 |
| Aqueous potassium hydroxide (45%) solution | 7 |

The charge was heated to 65–70° C., and 603 grams (10.4 mols) of propylene oxide were slowly pumped in, keeping the temperature at 65–70° C. through cooling. Then the temperature was raised to 135° C. and an additional amount of 1460 grams (25.1 mols) of propylene oxide were slowly pumped in. After the addition was completed, 16.3 grams of a 50% aqueous solution of tartaric acid was added, and the product was stripped at 150° C. at 25 mm. Hg and filtered. Yield: 2403 grams of a brownish syrup, nitrogen content, 7.45%; hydroxyl number, 606; viscosity at 25° C., 10,000 cp.

PREPARATION OF FLAME RETARDANT POLYOLS

The flame retardant polyols are made by blending alkoxylated novolacs with alkoxylated amines. Since the alkoxylated novolacs are either solids or semi-solids at room temperature, the blending operation is conveniently conducted at elevated temperatures although it could be done at low or room temperatures if necessary. The compositions of the blends are listed in the following table:

The term B.R. means "burning rapidly."
The term B means "burning."
The following definitions apply to the products identified by the numerals (1), (2), (3), (4), (5) respectively in the above table:

(1) 400 gms. resin C were dissolved in 600 gms. CP-260 (tris-hydroxypropyl glycerol). Hydroxyl number of this blend was 530 and viscosity 30800 cps. at 25° C. This was necessary because resin C is a solid and as such not suitable for foam formation.

(2) Fire retardant additive, O,O-diethyl-N,N-bis-(2-hydroxyethyl) amino phosphonate, made by Stauffer Chem. Co.

(3) A silicone-based foam stabilizer, made by General Electric Co.

(4) A catalyst, triethylene diamine made by Houdry Process and Chem. Co.

(5) A polymethylene polyphenylisocyanate, made by Mobay Chemical Co.

TABLE 1

| Polyol Designation No. | Composition (percent by weight) | | OH number | Polyol constants | |
|---|---|---|---|---|---|
| | Alkoxyl Novolac component (a) | Alkoxyl amine component (b) | | Nitrogen content, percent | Viscosity, 25° C. (cps) |
| 1 | 33% resin A | 67% resin U | 480 | 2.9 | 7,900 |
| 2 | 50% resin B | 50% resin V | 492 | 2.7 | 12,000 |
| 3 | 50% resin B | 50% resin W | 535 | 3.1 | 41,500 |
| 4 | 40% resin C | 60% resin X | 550 | 3.4 | 18,400 |
| 5 | 50% resin B | 50% resin Y | 497 | 2.6 | 12,000 |
| 6 | 35% resin C | 65% resin X | 567 | 3.7 | 12,800 |
| 7 | 40% resin C | 60% resin Z | 498 | 4.5 | 664,000 |
| 8 | 40% resin C | 30% resin X and 30% resin Z. | 501 | 3.7 | 42,000 |

Preparation of foams

The foams were prepared in accordance with Table 2 below.

The polyol, the foam stabilizer, the blowing agent and the catalyst were thoroughly mixed. Then the polyisocyanate was added and stirred into the mixture for 15 seconds at 4,000 r.p.m. The resulting foam buns were aged at room temperature for a week before testing.

All formulations contain the reactants in such a ratio that the mol ratio NCO/OH is 1.02 to 1.08.

It becomes evident from Table 2 that the novel polyols yield self-extinguishing foams and that a relatively small amount of a flame proofing additive renders them "non-burning."

The components per se of these polyols are definitely inferior to the blends described in this invention as shown by the properties illustrated in columns XII and XIII of Table 2.

It will be obvious to those skilled in the art that other changes and variations may be made in carrying out the

TABLE 2.—FOAM FORMULATIONS (PARTS BY WEIGHT)

| Ingredients | Foam No. | | | | | | | | | | | | |
|---|---|---|---|---|---|---|---|---|---|---|---|---|---|
| | I | II | III | IV | V | VI | VII | VIII | IX | X | XI | XII | XIII |
| Polyol No. 1 | 80.5 | | | | | | | | | | | | |
| Polyol No. 2 | | 79.5 | | | | | | | | | | | |
| Polyol No. 3 | | | 75.6 | | | | 64.9 | | | | | | |
| Polyol No. 4 | | | | 74.4 | | | | 64.5 | | | | | |
| Polyol No. 5 | | | | | 79.0 | | | | 68.0 | | | | |
| Polyol No. 6 | | | | | | | | | | 64.5 | | | |
| Polyol No. 7 | | | | | | 78.5 | | | | | 64.9 | | |
| Polyol No. 8 | | | | | | | | | | | | 64.5 | |
| Resin X | | | | | | | | | | | | | |
| Resin CC [1] | | | | | | | | | | | | | 76.0 |
| Fyrol No. 6 [2] | | | | | | | 11.3 | 11.3 | 11.3 | 11.3 | 11.3 | | |
| SF-1079 [3] | 1.5 | 1.5 | 1.5 | 1.5 | 1.5 | 1.5 | 1.5 | 1.5 | 1.5 | 1.5 | 1.5 | 1.5 | 1.5 |
| Freon 11 | 22.5 | 22.5 | 22.5 | 22.5 | 22.5 | 22.5 | 22.3 | 22.3 | 22.3 | 22.5 | 22.3 | 22.5 | 22.3 |
| DABCO [4] | | | 0.4 | 0.2 | | | 0.4 | 0.2 | | 0.1 | | 0.2 | 0.75 |
| Mondur MR [5] | 95.5 | 96.5 | 100.0 | 101.2 | 97.0 | 97.5 | 100.0 | 100.0 | 97.0 | 108.0 | 94.0 | 101.2 | 100.0 |
| Cream time, sec. | 40 | 45 | 47 | 35 | 42 | 23 | 40 | 43 | 45 | 55 | 35 | 35 | 35 |
| Rise time, sec. | 121 | 149 | 150 | 130 | 165 | 98 | 135 | 165 | 165 | 191 | 127 | 107 | 90 |
| Density, lb./ft.³ | 2.08 | 2.20 | 2.21 | 2.05 | 2.12 | 1.97 | 2.20 | 2.18 | 2.37 | 2.01 | 1.98 | 2.09 | 2.15 |
| Burn test 59T, ASTM 16920 | S.E. | S.E. | S.E. | S.E. | S.E. | S.E. | N.B. | N.B. | N.B. | N.B. | N.B. | B-R | B |

All of the foams in Table 2 were fine-celled, tough and non-friable, with the exception of foam under number XIII, which was large-celled, extremely weak and friable.

Definition of terms

The term S.E. means "selfextinguishing."
The term N.B. means "non-burning."

present invention without departing from the spirit and scope thereof as defined in the appended claims.

I claim:

1. A flame retardant polyurethane consisting essentially of the reaction product of (1) an organic polyisocyanate and (2) a blend of polyols consisting essentially of components (a) and (b), component (a) being an oxyalkylated novolac which is a condensation product of an aldehyde, having the formula

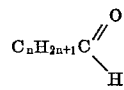

where $n$ is an integer of 0–10 and a monohydric phenol, having at least 2 hydrogens reactive towards an aldehyde, and component (b) being an oxyalkylated reaction product of a 1,2-epoxide with a nitrogen compound having the following formula:

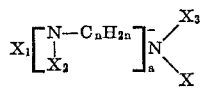

wherein $X_1$, $X_2$, $X_3$, $X_4$, are selected from the group of

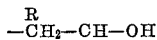

and wherein R is selected from a group consisting of hydrogen, alkyl, aryl, halogenalkyl and halogenaryl and where $a$ is 0, 1, 2, 3, 4, 5 and $n$ is an integer of at least 2, said blend containing about 10% to about 70% of component (a) and about 90% to about 30% of component (b).

2. A flame retardant polyurethane according to claim 1 wherein (2) is a blend of (a) a propoxylated fusible phenol formaldehyde novolac and (b) an oxylalkylated amine formed by the reaction of one moleamine selected from a group consisting of monoethanolamine, diethanolamine, triethanolamine, ethylenediamine, diethylenetriamine, triethylenetetramine and tetraethylenepentamine with 3–12 moles of an alkyleneoxide selected from a group consisting of ethyleneoxide, propyleneoxide, butyleneoxide, and styreneoxide, and said blend consisting essentially of about 20% to about 50% of component (a) and about 80% to about 50% of component (b).

3. A flame retardant polyurethane foam consisting essentially of the reaction product according to claim 2 wherein the reaction of components (a) and (b) is carried out in the presence of a blowing agent.

4. A flame retardant polyurethane according to claim 1 wherein (2) is a blend of (a) about 35% to about 65% of a propoxylated fusible phenol-formaldehyde novolac and (b) about 65% to about 35% of a propoxylated amine selected from a group consisting of propoxylated triethanolamine, propoxylated diethanolamine, propoxylated monoethanolamine and propoxylated ethylenediamine, wherein from 3–8 moles of propylene oxide are reacted with 1 mole of amine.

5. A flame retardant polyurethane foam consisting essentially of the reaction product according to claim 4 wherein the reaction is carried out in the presence of a blowing agent.

6. A flame retardant polyurethane consisting essentially of the reaction product of (1) an organic polyisocyanate and (2) a blend of polyols consisting essentially of (a) about 40% of a propoxylated fusible phenol-formaldehyde novolac and (b) about 60% of a propoxylated amine wherein the amine is selected from a group consisting of monoethanolamine, diethanolamine and triethanolamine and wherein from 3–8 moles of propyleneoxide are reacted with 1 mole of said amine.

7. A flame retardant polyurethane foam consisting essentially of the reaction product of claim 6 in which the reaction is carried out in the presence of a blowing agent.

8. A flame retardant foam according to claim 1 wherein the reaction between (1) and (2) takes place in the presence of a blowing agent.

References Cited

UNITED STATES PATENTS

| | | | |
|---|---|---|---|
| 2,499,366 | 3/1950 | De Groote et al. | 252—331 |
| 2,560,333 | 7/1951 | De Groote et al. | 252—331 |
| 2,854,416 | 9/1958 | De Groote | 252—344 |
| 3,032,517 | 5/1962 | Dombrow et al. | 260—2.5 |
| 3,094,434 | 6/1963 | Chapman et al. | 117—106 |
| 3,112,281 | 11/1963 | Gromacki et al. | 260—2.5 |
| 3,136,731 | 6/1964 | Piechota et al. | 260—2.5 |
| 3,159,591 | 12/1964 | Lanham | 260—2.5 |
| 3,194,773 | 7/1965 | Hostettler | 260—2.5 |
| 3,236,790 | 2/1966 | Szabat | 260—2.5 |
| 3,242,107 | 3/1966 | Bunge et al. | 260—2.5 |
| 3,245,924 | 4/1966 | Cox et al. | 260—2.5 |
| 3,255,253 | 6/1966 | Kuryla | 260—584 |
| 3,297,597 | 1/1967 | Edwards et al. | 260—2.5 |

WILLIAM H. SHORT, Primary Examiner

HOWARD SCHAIN, Assistant Examiner

U.S. Cl. X.R.

260—51.5, 53, 59, 77.5, 838

Disclaimer 3,470,118.—*Wolfgang C. Forster*, Middletown, N.Y. FLAME-RESISTANT POLYOL URETHANE FOAM COMPOSITION AND PROCESS OF PRODUCING THE SAME. Patent dated Sept. 30, 1969. Disclaimer filed Feb. 16, 1972, by the assignee, *Reichhold Chemicals, Inc.*
Hereby enters this disclaimer to claims 1 and 8 of said patent.

[*Official Gazette July 11, 1972.*]